US011565774B2

(12) United States Patent
Noah

(10) Patent No.: US 11,565,774 B2
(45) Date of Patent: Jan. 31, 2023

(54) ADDITIVE MANUFACTURED WATER RESISTANT CLOSED-CELL LATTICE STRUCTURE FOR MARINE HULL CAVITIES

(71) Applicant: Adam Jon Noah, Stillwater, MN (US)

(72) Inventor: Adam Jon Noah, Stillwater, MN (US)

( * ) Notice: Subject to any disclaimer, the term of this patent is extended or adjusted under 35 U.S.C. 154(b) by 345 days.

(21) Appl. No.: 16/591,328

(22) Filed: Oct. 2, 2019

(65) Prior Publication Data

US 2020/0108893 A1 Apr. 9, 2020

Related U.S. Application Data

(60) Provisional application No. 62/908,285, filed on Sep. 30, 2019, provisional application No. 62/740,581, filed on Oct. 3, 2018.

(51) Int. Cl.
*B33Y 10/00* (2015.01)
*B63B 5/24* (2006.01)
(Continued)

(52) U.S. Cl.
CPC .............. *B63B 5/24* (2013.01); *B32B 15/085* (2013.01); *B32B 15/09* (2013.01); *B32B 15/20* (2013.01); *B32B 27/12* (2013.01); *B32B 27/32* (2013.01); *B32B 27/365* (2013.01); *B33Y 10/00* (2014.12); *B33Y 70/00* (2014.12); *B33Y 80/00* (2014.12);
(Continued)

(58) Field of Classification Search
CPC ................................ B33Y 10/00; B33Y 70/00
See application file for complete search history.

(56) References Cited

U.S. PATENT DOCUMENTS

| 4,821,667 A | 4/1989 | Hargett, Sr. |
| 7,625,625 B2 | 12/2009 | Rios et al. |

(Continued)

FOREIGN PATENT DOCUMENTS

| NL | 2015101 B1 | 7/2015 |
| WO | 2019089269 A1 | 5/2019 |

OTHER PUBLICATIONS

NCFI Plyurethanes, Void Fill and Flotation, ncfi.com, n.d., [online], [retrieved on Sep. 11, 2019]. Retrieved from the Internet <http://ncfi.com/cfp/products/void-fill-flotation/>.
(Continued)

*Primary Examiner* — Christopher T Schatz
(74) *Attorney, Agent, or Firm* — Craige Thompson; Thompson Patent Law; Timothy D. Snowden

(57) ABSTRACT

Apparatus and associated methods relate to using an additive (material deposition) process to incrementally form a closed-cell lattice structure formed as a unitary body in the shape of a marine hull cavity, the unit cells of the closed-cell lattice structure are substantially hollow. In an illustrative example, a method may include (a) forming a closed-cell lattice structure through additive manufacture, the hull cavity material may be bonded to an upper manufactured liner and a lower manufactured liner through lamination or mechanical connection. Unit cells of the closed-cell lattice structure may include hollow voids filled with gases. Providing the additive manufactured closed-cell lattice structure with a unitary body and hollow voids to trap gases may further advantageously promote the buoyancy and reduce the degeneration of a marine hull.

11 Claims, 5 Drawing Sheets

(51) Int. Cl.
| | |
|---|---|
| *B33Y 80/00* | (2015.01) |
| *B32B 15/085* | (2006.01) |
| *B32B 15/20* | (2006.01) |
| *B32B 27/12* | (2006.01) |
| *B32B 27/36* | (2006.01) |
| *B32B 27/32* | (2006.01) |
| *B33Y 70/00* | (2020.01) |
| *B32B 15/09* | (2006.01) |
| *B63B 73/00* | (2020.01) |

(52) U.S. Cl.
CPC ........ *B63B 73/00* (2020.01); *B32B 2262/101* (2013.01); *B32B 2605/12* (2013.01); *B63B 2005/245* (2013.01); *B63B 2221/00* (2013.01)

(56) References Cited

U.S. PATENT DOCUMENTS

| | | | |
|---|---|---|---|
| 8,994,592 B2 | 3/2015 | Scott et al. | |
| 9,552,900 B2 | 1/2017 | Hasegawa et al. | |
| 9,676,963 B2 | 6/2017 | Rolland et al. | |
| 9,718,516 B2 | 8/2017 | Read | |
| 9,774,962 B2 | 9/2017 | Karamuk et al. | |
| 9,896,565 B2 | 2/2018 | Nosker et al. | |
| 9,957,842 B2 | 5/2018 | Lowth et al. | |
| 9,987,798 B2 | 6/2018 | Tyler | |
| 9,993,996 B2 | 6/2018 | Chung | |
| 10,155,882 B2 | 12/2018 | Rolland et al. | |
| 2002/0058456 A1 | 5/2002 | Miller | |
| 2007/0013109 A1 | 1/2007 | Mataya et al. | |
| 2014/0001670 A1 | 1/2014 | Drever | |
| 2014/0374935 A1 | 12/2014 | Flitsch et al. | |
| 2015/0078712 A1 | 3/2015 | Brunner et al. | |
| 2015/0197063 A1 | 7/2015 | Shinar et al. | |
| 2016/0009029 A1 | 1/2016 | Cohen et al. | |
| 2016/0101980 A1 | 4/2016 | Hasegawa et al. | |
| 2016/0109316 A1 | 4/2016 | Chiang et al. | |
| 2016/0167791 A1 | 6/2016 | Roach et al. | |
| 2016/0207111 A1* | 7/2016 | Robrecht | B22F 3/1017 |
| 2016/0290647 A1 | 10/2016 | Propheter-Hinckley et al. | |
| 2016/0318248 A1 | 11/2016 | Susnjara et al. | |
| 2016/0325520 A1* | 11/2016 | Berger | E04B 1/28 |
| 2016/0349738 A1 | 12/2016 | Sisk | |
| 2017/0036783 A1 | 2/2017 | Snyder | |
| 2017/0037674 A1 | 2/2017 | Hooper et al. | |
| 2017/0096191 A1 | 4/2017 | Hasholt | |
| 2017/0100893 A1 | 4/2017 | Meisner et al. | |
| 2017/0136697 A1 | 5/2017 | Kia et al. | |
| 2017/0136698 A1 | 5/2017 | Kia et al. | |
| 2017/0173872 A1 | 6/2017 | McCall et al. | |
| 2017/0217088 A1 | 8/2017 | Boyd, IV et al. | |
| 2017/0220030 A1 | 8/2017 | Grube et al. | |
| 2017/0226674 A1* | 8/2017 | Jerez | B32B 5/02 |
| 2017/0232549 A1 | 8/2017 | Lacaze et al. | |
| 2017/0320267 A1 | 11/2017 | Lind et al. | |
| 2017/0321047 A1 | 11/2017 | Vantomme et al. | |
| 2018/0151266 A1 | 5/2018 | Kim | |
| 2018/0171157 A1 | 6/2018 | Magin et al. | |
| 2018/0186070 A1 | 7/2018 | Yun et al. | |
| 2018/0194083 A1 | 7/2018 | Bouwmeester | |
| 2018/0305266 A1 | 10/2018 | Gibson et al. | |
| 2019/0039213 A1 | 2/2019 | Merlo et al. | |
| 2020/0031436 A1* | 1/2020 | Paull | B63B 5/20 |

OTHER PUBLICATIONS

Closed Cell Foam...waterlogged, The Hull Truth Boating Forum, Mar. 21, 2003, 16 pages. Retrieved from the Internet <https://www.thehulltruth.com/boating-forum/11012-closed-cell-foam-waterlogged.html>.

Setting water out flotation foam, iboats Boating Forums, Aug. 14, 2014, 8 pages. Retrieved from the Internet <https://forums.iboats.com/forum/general-boating-outdoors-activities/boat-topics-and-questions-not-engine-topics/8399020-getting-water-out-flotation-foam>.

How to Tell if Foam is Wet or Okay???, boatdesign.net, May 10, 2012, 9 pages. Retrieved from the Internet <https://www.boatdesign.net/threads/how-to-tell-if-foam-is-wet-or-okay.43019/>.

Water-logged Boat?, MasterCraft, Jul. 15, 2015, 3 pages. Retrieved from the Internet <https://teamtalk.mastercraft.com//showthread.php?p=1161807&nojs=1>.

How to determine water logged foam inside hull?, The Hull Truth Boating Forum, Sep. 12, 2011, 9 pages. Retrieved from the Internet <https://www.thehulltruth.com/boating-forum/376453-how-determine-water-logged-foam-inside-hull.html>.

* cited by examiner

ADDITIVE MANUFACTURED WATER RESISTANT CLOSED-CELL LATTICE STRUCTURE FOR MARINE HULL CAVITIES

CROSS-REFERENCE TO RELATED APPLICATIONS

This application claims the benefit of U.S. Provisional Application Ser. No. 62/740,581, titled "Additive Manufactured Closed Cell Lattice Structure for Marine Cavities and Hull Molding Process," filed by Adam Jon Noah, on Oct. 3, 2018 and the benefit of U.S. Provisional Application Ser. No. 62/908,285, titled "Additive Manufactured Closed Cell Lattice Structure for Marine Cavities," filed by Adam Jon Noah, on Sep. 30, 2019.

This application incorporates the entire contents of the foregoing applications herein by reference.

TECHNICAL FIELD

Various embodiments relate generally to manufacturing a marine structure.

BACKGROUND

A boat is a watercraft of a large range of type and size. Ships are generally distinguished from boats based on their larger size, shape, and cargo or passenger capacity, and the ability to carry boats. Boats have served as transportation since the earliest times. Small boats are typically found on inland waterways such as rivers and lakes, or in protected coastal areas. Some boats, such as the whaleboat, were intended for use in an offshore environment. In modern naval terms, a boat may be small enough to be carried aboard a ship. Boats vary in proportion and construction methods due to their intended purpose, available materials, or local traditions. Canoes have been used since prehistoric times and remain in use throughout the world for transportation, fishing, and sport. Fishing boats vary widely in style partly to match local conditions. Pleasure crafts used in recreational boating include ski boats, pontoon boats, and sailboats. House boats may be used for vacationing or long-term residence.

SUMMARY

Apparatus and associated methods relate to using an additive (material deposition) process to incrementally form a closed-cell lattice structure formed as a unitary body in the shape of a marine hull cavity, the unit cells of the closed-cell lattice structure are substantially hollow. In an illustrative example, a method may include (a) forming a closed-cell lattice structure through additive manufacturing, the hull cavity material may be bonded to an upper manufactured liner and a lower manufactured liner through lamination or mechanical connection. Some embodiments may use continuous laminating process to the closed-cell lattice structure as opposed to formed liners. Unit cells of the closed-cell lattice structure may include hollow voids filled with gases. Providing the closed-cell lattice structure with a unitary body and hollow voids to trap gases may further advantageously promote the buoyancy and reduce the degeneration of the hull.

Various embodiments may achieve one or more advantages. For example, some embodiments may use the closed-cell lattice structure with a unitary body, which may enable a uniformly stressed marine hull and advantageously improve the structural strength of the marine hull. Some embodiments may use closed-cell lattice structure formed by additive manufacturing, which may improve water-resistant property of the closed-cell lattice structure to further prevent water intrusion. Some embodiments may improve longevity through strength of various materials and design capabilities used in additive manufacturing. The uniformed structure of the closed-cell lattice structure may reduce defects, and then reduce cracks. In other words, the safety, longevity and strength of a vehicle hull may be advantageously prolonged.

BRIEF DESCRIPTION OF THE DRAWINGS

Like reference symbols in the various drawings indicate like elements.

DETAILED DESCRIPTION OF ILLUSTRATIVE EMBODIMENTS

Additive manufacturing builds a three-dimensional object by successively adding material layer by layer, which is why additive manufacturing printing process is also called 3D-printing, unlike conventional machining, casting and forging processes, where material is removed from a stock item (subtractive manufacturing) or poured into a mold and shaped by means of dies, presses, and hammers.

The term "additive manufacturing" covers a variety of processes in which material is joined or solidified under computer control to create a three-dimensional object, with material being added together (such as liquid molecules or powder grains being fused together), typically layer by layer. One of the key advantages of additive manufacturing is the ability to produce very complex shapes or geometries, and a prerequisite for producing any additive manufactured part is a digital 3D model or a CAD file. Based on additive manufacturing, users may quickly complete the design, production and operation in a short time. Products made by additive manufacturing method has a unique structure, low cost and rapid design to production timeframes.

Figure 1:
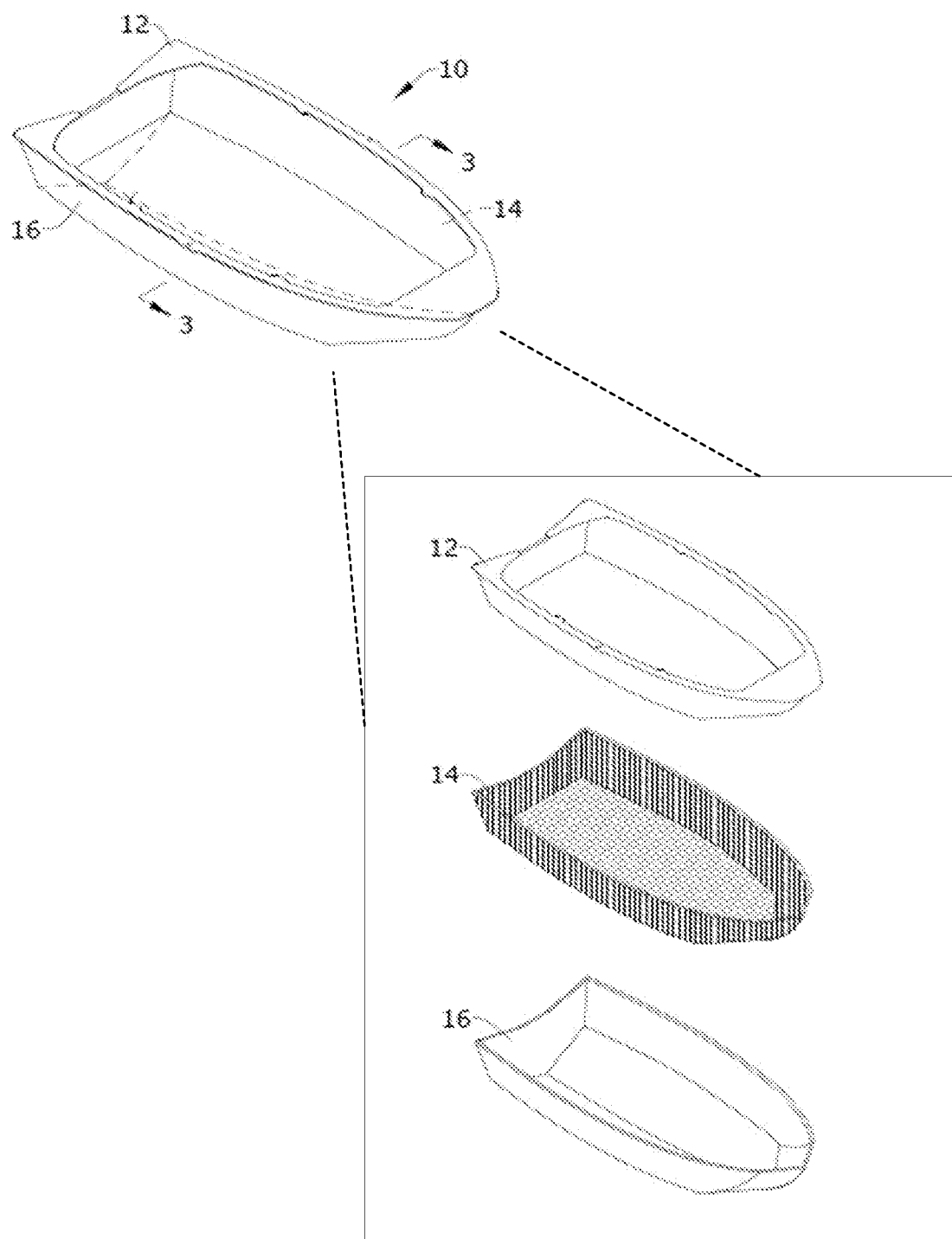
FIG. 1 depicts an exemplary hull structure and the exploded view of the exemplary hull structure.

FIG. 1 depicts an exemplary hull structure and the exploded view of the exemplary hull structure. In this depicted example, an exemplary watercraft 10 includes an upper manufactured liner 12 and a lower manufactured liner 16. The cavity formed between the upper manufactured liner 12 and the lower manufactured liner 16 is formed by a closed-cell lattice structure 14. In this depicted example, the closed-cell lattice structure 14 is formed, by additive manufacturing process, as a unitary body in the shape of the watercraft cavity, and the closed-cell lattice structure 14 is substantially hollow to provide buoyancy. The additive manufactured lattice structure has a lattice structure, and each unit cell of the lattice structure includes a hollow void filled with atmospheric gases to facilitate both flotation of the marine hull and exclude water. In some embodiments, the hull may exhibit strength to support features of the hull, for example, up to 25 feet in length.

This method may use additive manufacturing, fused deposition modelling (FDM) technology to incrementally build the closed-cell lattice structure using overhangs in the print design to trap atmospheric gases. By providing an additive manufactured closed-cell lattice structure with a unitary body, the hull 10 may have be uniformly stressed, which may advantageously improve the structural strength of the watercraft. As the lattice structure includes hollow voids filled with atmospheric gases, the hull may have improved water-resistance and flotation characteristics. Thus, the longevity of the hull may be advantageously prolonged.

In some embodiments, the closed-cell lattice structure may be printed by fused deposition modelling (FDM). In some embodiments, a material jetting may be used to create the closed-cell lattice structure in the shape of the cavity. The closed-cell lattice structure may be made by different materials. For example, the closed-cell lattice structure may be made by polyethylene or polycarbonate. The upper liner 12 and the lower liner 16 may also be made by a variety of materials. For example, in some embodiments, the upper manufactured liner 12 and/or the lower manufactured liner 16 may be formed by fiberglass. In some embodiments, the upper manufactured liner 12 and/or the lower manufactured liner 16 may be formed by aluminum.

In some embodiments, the upper liner, the lower liner and the closed-cell lattice structure may be additive manufactured together to generate the final hull structure as a unitary body, which may further prevent water from entering into the marine hull.

Figure 2:
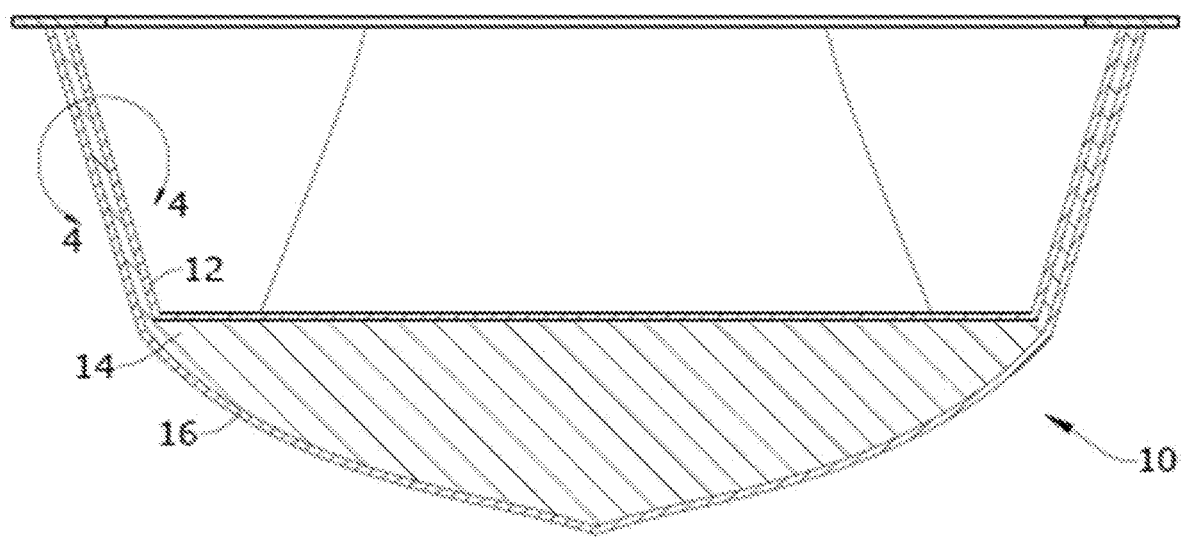
FIG. 2 depicts a section view of the exemplary hull structure, taken along line 3-3 in FIG. 1.

FIG. 2 depicts a section view of the exemplary hull structure, taken along line 3-3 in FIG. 1.

Figure 3:
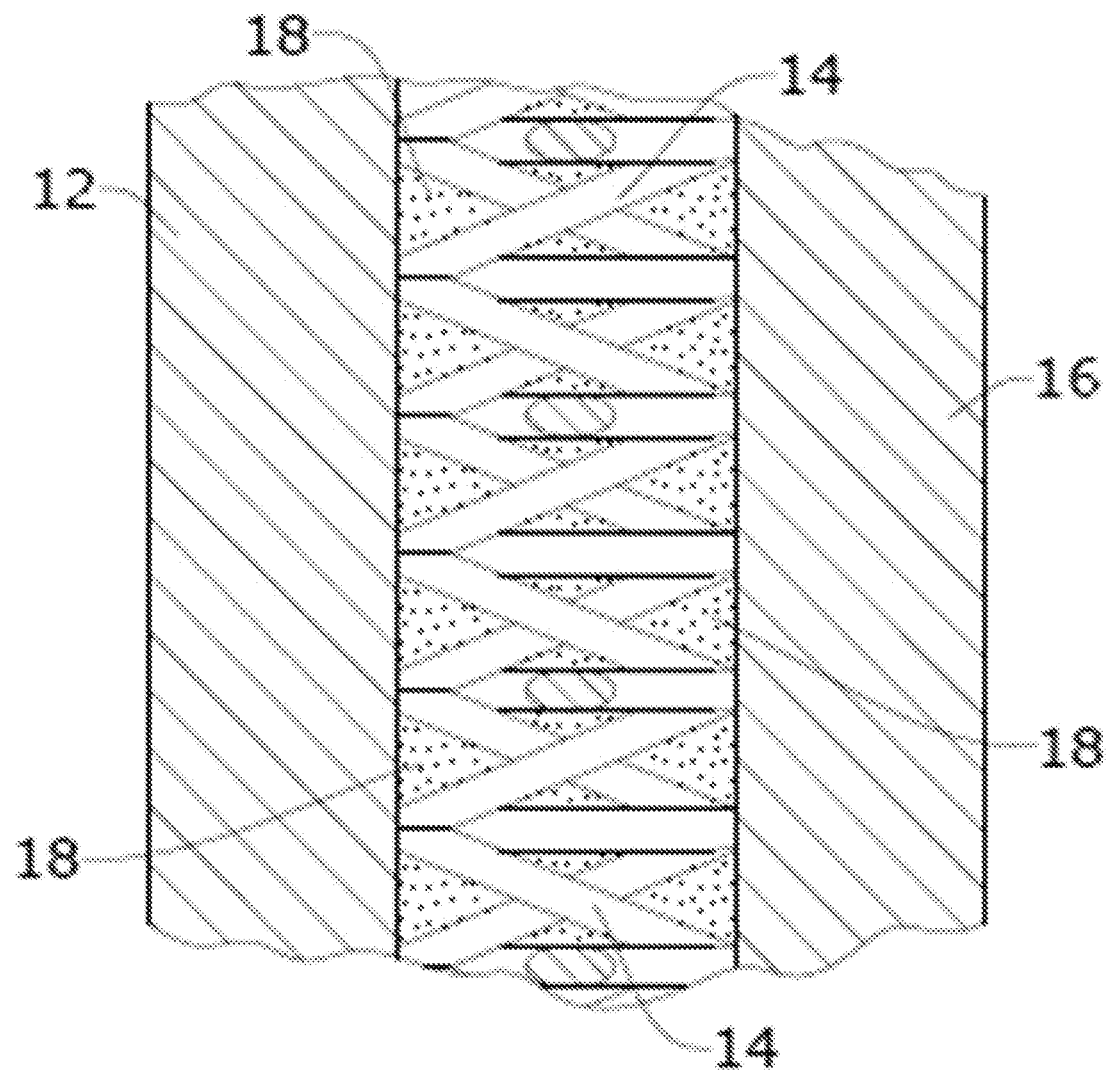
FIG. 3 depicts a detailed section view of the hull structure, taken along line 4-4 in FIG. 2.

FIG. 3 depicts a detailed section view of the hull structure, taken along line 4-4 in FIG. 2. As shown in FIG. 3, the lattice structure of the additive manufactured closed-cell lattice structure 14 includes hollow voids 18 (e.g., air pocket) filled with atmospheric gases.

Figure 4:
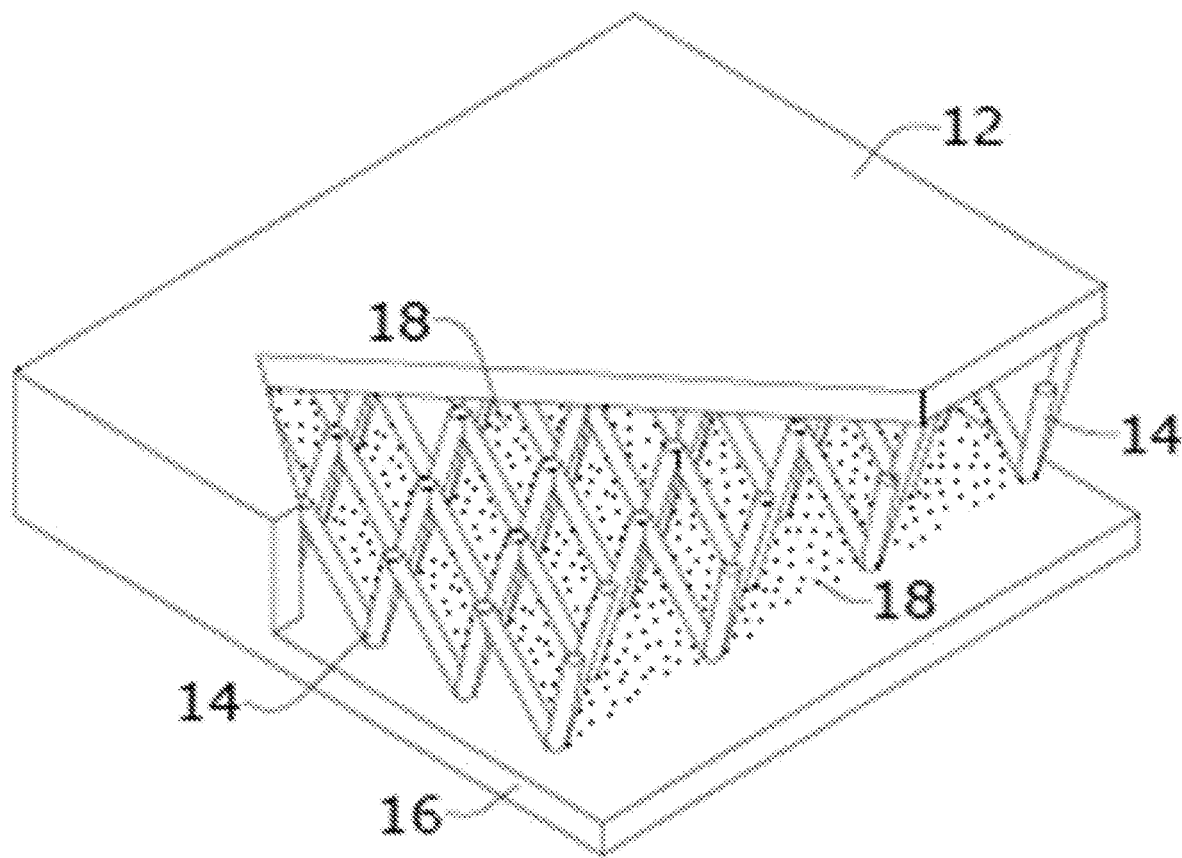
FIG. 4 depicts a schematic perspective view of an exemplary embodiment of a closed-cell lattice in the hull structure.

FIG. 4 depicts a schematic perspective view of an exemplary embodiment of a closed-cell lattice in the hull structure. As shown in FIG. 4, the lattice structure of the additive manufactured closed-cell lattice structure 14 includes four-sided triangle structure to provide improved structural strength. In other embodiments, all or a portion of the structure of the additive manufactured closed-cell lattice structure may correspond (or Substantially correspond) to one or more Bravais lattice or unit cell structures, including cubic (including simple, body-centered or face-centered), tetragonal (including simple or body-centered), monoclinic (including simple or end-centered), orthorhombic (including simple, body-centered, face-centered or end-centered), rhombohedral, hexagonal and triclinic structures.

Figure 5:
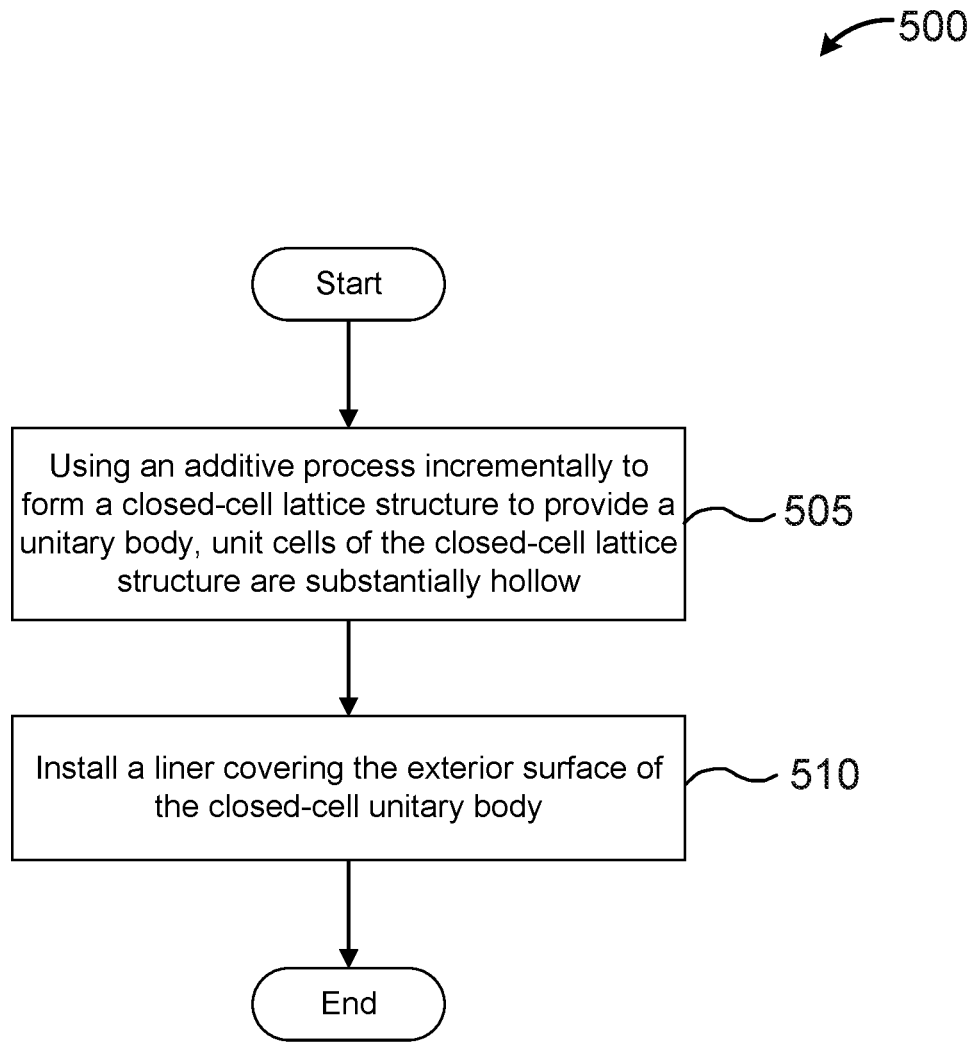
FIG. 5 depicts a flowchart of an exemplary method to manufacture the hull structure.

FIG. 5 depicts a flowchart of an exemplary method to manufacture the hull structure. Various embodiments of manufacturing the hull structure may be the method disclosed in the U.S. Provisional Application Ser. No. 62/740,581, titled "Additive Manufactured Closed Cell Lattice Structure for Marine Cavities and Hull Molding Process," filed by Adam Jon Noah, on Oct. 3, 2018. In this depicted example, an exemplary method 500 of manufacturing the hull structure may include manufacturing or modelling an upper liner (e.g., the upper liner 12) and a lower liner (e.g., the lower liner) and determining the cavity between the upper liner and the lower liner.

The method 500 includes, at 505, using an additive process incrementally to form a network of closed-cell lattice structure 14 to provide a unitary body in the shape of the cavity. The unit cells of the closed-cell lattice structure are substantially hollow. The additive manufactured closed-cell lattice structure 14 includes hollow voids (e.g., air chamber pockets 18) filled with atmospheric gases to facilitate both flotation of the marine hull and exclude water.

A digital file may be created before the additive manufacturing. Different additive manufacturing modelling software tools may be used to generate an additive manufactured modelling. Successive layers of materials may be incrementally deposited until the closed-cell lattice structure 14 is formed. The materials (e.g., polyethylene or polycarbonate) may be subjected to a chamber filled with one or more predetermined gases (e.g., nitrogen) under, for example, high pressure, or atmospheric gases. Gases may become trapped during the additive manufacturing process by use of overhangs in the layers of the closed cell lattice structure.

The method 500 also includes, at 510, installing a liner (e.g., the upper liner 12 and the lower liner) to cover the exterior surface of the closed-cell unitary body. By building a hull with an additive manufactured closed-cell lattice structure having unitary body and hollow voids filled with gases, the shape of a marine hull with the additive manufactured closed-cell lattice structure may be advantageously maintained with reduced degrading and improved floatation property.

In production of vehicle hulls, cavities filled with additive manufactured material may increase strength and longevity compared to traditional methods of manufacturing. Also, the method may produce greater flexibility in hull design as well as weight distribution. Applications of this design can be applied to other production items requiring increased strength and durability. [002.7] Although various embodiments have been described with reference to the figures, other embodiments are possible. For example, the method may be applied to other production items that want increased structural strength and durability. In some embodiments, the hollow void may be filled with different gases rather than the atmosphere to further promote the buoyancy. For example, hydrogen, nitrogen, and/or oxygen may be added into the hollow voids to further improve the floatation of the hull.

In one exemplary aspect, a method of manufacturing a marine hull includes (a) providing or modelling an upper liner having a first configuration, (b) providing or modelling a lower liner having a second configuration that substantially fits the first configuration of the upper liner, (c) simulating a cavity defined by the difference between the first configuration and the second configuration, and (d) using an additive manufacturing process to incrementally form a closed-cell lattice structure, the closed-cell lattice structure is formed as a unitary body in the shape of the cavity, and unit cells of the closed-cell lattice structure comprise hollow voids filled with gases.

In some embodiments, the method may also include installing the provided upper liner and lower liner to cover the exterior surface of the closed-cell lattice structure. In some embodiments, the upper liner may include fiberglass. In some embodiments, the upper liner may include aluminum. In some embodiments, the gases may include atmospheric gases. In some embodiments, the gases may include hydrogen. In some embodiments, the gases may include nitrogen. In some embodiments, the closed-cell lattice structure material may include polyethylene. In some embodiments, the closed-cell lattice structure material may include polycarbonate. In some embodiments, each unit cell of the unit cells may be in the form of tetrahedron.

In another exemplary aspect, an apparatus is formed by a method of manufacturing a marine hull, the method includes (a) providing or modelling an upper liner having a first configuration, (b) providing or modelling a lower liner having a second configuration that substantially fits the first configuration of the upper liner, (c) simulating a cavity defined by the by the difference between the first configuration and the second configuration; and, (d) using an additive manufacturing process to incrementally form a closed-cell lattice structure, the closed-cell lattice structure is formed as a unitary body in the shape of the cavity, and unit cells of the closed-cell lattice structure comprise hollow voids filled with gases, and, (e) installing the provided upper liner and the lower liner to cover the exterior surface of the closed-cell lattice structure.

In some embodiments, the method may also include using an additive manufacturing process to generate the upper liner. In some embodiments, the upper liner may include fiberglass. In some embodiments, the upper liner may include aluminum. In some embodiments, the gases may include atmospheric gases. In some embodiments, the gases may include hydrogen. In some embodiments, the gases may include nitrogen. In some embodiments, the closed-cell lattice structure material may include polyethylene. In some embodiments, the closed-cell lattice structure material may include polycarbonate. In some embodiments, each unit cell of the unit cells may be in the form of tetrahedron.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A method of manufacturing a marine hull, the method comprising: at least one of: providing, or modelling an upper liner having a first configuration; at least one of: providing, or modelling a lower liner having a second configuration that substantially fits the first configuration of the upper liner; simulating a cavity defined by a difference between the first configuration and the second configuration; and; using an additive manufacturing process to incrementally form, via additive manufacturing, a plurality of closed unit cells each trapping a quantity of at least one predetermined gas to form a closed-cell lattice structure configured to prevent water intrusion into the closed unit cells such that the closed-cell lattice structure is formed as a unitary body in the shape of the cavity, and unit cells of the closed-cell lattice structure comprise hollow voids filled with gases, wherein the gases comprise hydrogen gas.

2. The method of claim 1, further comprising:
   installing the provided upper liner and lower liner to cover an exterior surface of the closed-cell lattice structure.

3. The method of claim 1, wherein the upper liner comprises fiberglass.

4. The method of claim 1, wherein the upper liner comprises aluminum.

5. The method of claim 1, wherein the gases comprise nitrogen.

6. The method of claim 1, wherein the closed-cell lattice structure comprises polyethylene.

7. The method of claim 1, wherein the closed-cell lattice structure comprises polycarbonate.

8. The method of claim 1, wherein each unit cell of the unit cells is in the form of tetrahedron.

9. The method of claim 1, wherein the shape of the cavity comprises a non-uniform exterior surface.

10. The method of claim 1, wherein the closed unit cells are each formed incrementally such that substantially each of the closed unit cells entrap the at least one predetermined gas in the hollow voids.

11. The method of claim 1, wherein the additive manufacturing comprises fused deposition.

* * * * *